United States Patent

Nishimura

[11] Patent Number: 5,738,188
[45] Date of Patent: Apr. 14, 1998

[54] BRAKE APPARATUS HAVING TOE-IN SETTING MEMBER BETWEEN BRAKE SHOE AND CLAMPING MECHANISM FOR USE FOR CYCLE

[75] Inventor: Yasushi Nishimura, Sakai, Japan

[73] Assignee: Shimano Inc., Sakai, Japan

[21] Appl. No.: 495,680

[22] PCT Filed: Jan. 19, 1995

[86] PCT No.: PCT/JP95/00048

§ 371 Date: Aug. 2, 1995

§ 102(e) Date: Aug. 2, 1995

[87] PCT Pub. No.: WO96/22476

PCT Pub. Date: Jul. 25, 1996

[51] Int. Cl.$^6$ ............................................. B62L 1/08
[52] U.S. Cl. ............................... 188/24.19; 188/24.21
[58] Field of Search ........................ 188/24.12, 24.19, 188/24.21, 250 B, 2 P

[56] References Cited

U.S. PATENT DOCUMENTS

| | | | |
|---|---|---|---|
| 4,051,924 | 10/1977 | Yoshigai | 188/24.12 |
| 4,611,692 | 9/1986 | Everett | 188/250 B |
| 5,320,199 | 6/1994 | Min | 188/24.19 |
| 5,501,301 | 3/1996 | Nishimura | 188/24.19 |
| 5,503,252 | 4/1996 | Gelbein | 188/24.19 |

*Primary Examiner*—Matthew C. Graham
*Attorney, Agent, or Firm*—Armstrong, Westerman, Hattori, McLeland & Naughton

[57] ABSTRACT

A brake apparatus for a cycle designed so that a toe-in angle of a brake shoe can be set with ease and with high accuracy when the apparatus is assembled. When a toe-in setting member between the brake shoe and a clamping mechanism is deformed, a difference is produced between the angle at which a brake shoe is attached to a support member before the deformation and the angle at which the brake shoe is attached to the support member after deformation. The extent to which the toe-in setting member is deformable has previously been set so that the difference in angle will become a predetermined toe-in angle. A clamping mechanism is operated to clamp the brake shoe to the support member such that the brake shoe can be pressed against a wheel rim. Consequently, when the brake is operated, the brake shoe contacts the friction surface of the wheel rim with a predetermined toe-in angle.

5 Claims, 6 Drawing Sheets

(a)

(b)

5,738,188

1

BRAKE APPARATUS HAVING TOE-IN SETTING MEMBER BETWEEN BRAKE SHOE AND CLAMPING MECHANISM FOR USE FOR CYCLE

TECHNICAL FIELD

The present invention relates to a brake apparatus for a cycle. More particularly, the present invention relates to a brake apparatus for a cycle which is designed so that a support member which protects a brake shoe is operated so as to approach the rim of a wheel of the cycle, thereby pressing the brake shoe against the wheel rim to brake the wheel.

BACKGROUND ART

As a brake apparatus for a cycle, one which is disclosed, for example, in Japanese Utility Model Application Unexamined Publication (KOKAI) No. 3-62238 has heretofore been known. That is, a setting angle adjusting projection is formed on one end portion of a friction surface of a brake shoe, and when the brake shoe is to be attached to a support member, the position of the brake shoe is adjusted so that the adjusting projection on the friction surface and the other end portion of the adjusting projection assume a desired contact posture with respect to a wheel rim of the cycle, that is, the other friction surface with which the brake shoe is brought into contact.

The posture adjustment made by the adjusting projection enables the brake shoe to contact the wheel rim with a predetermined toe-in angle. That is, the surface of the brake shoe and the surface of the wheel rim contact each other at an angle. It is known that, in a case where there is no toe-in angle, that is, where the friction surface of the brake shoe and the friction surface of the wheel rim are in close contact with each other over the entire surface, uncomfortable vibration of the cycle body and noise may be caused by intermittent "stick-slip" motion or the like, whereas, in a case where there is such a toe-in angle, occurrence of uncomfortable vibration and noise can be prevented.

Hitherto, a brake shoe has been formed by using a material mixed with rigid friction particles of aluminum oxide, for example, so that the brakes can be effectively applied by friction created by the rigid friction particles even when the wheel rim is wet because of rainy weather or other reason. The brake shoe of the type which is mixed with rigid friction particles is formed into a predetermined shape by heating a rubber raw material, which has been mixed with rigid friction particles and vulcanized, in a molding die. Therefore, upon completion of the molding of the brake shoe, only the rubber material is present on the surface of the brake shoe, and no rigid friction particles are exposed on the brake shoe surface.

Since the coefficient of friction occurring between the rubber material and the friction surface of the wheel rim is small, the resulting braking force is weak. Therefore, the brake shoe is usually used after the brake shoe surface has been ground with a grinding stone so that rigid friction particles are exposed on the friction surface of the brake shoe. The grinding process enables an increase in the coefficient of friction created between the rigid friction particles and the friction surface of the wheel rim, thus allowing the brake shoe to exhibit satisfactory braking action.

However, when the above-described setting angle adjusting projection is present on the friction surface of the brake shoe, it is necessary to grind the friction surface such that the adjusting projection will not be cut off. Accordingly, the usability of the brake shoe becomes extremely deteriorated. Therefore, the conventional technique cannot practically be utilized for mass-produced articles. In other words, the above-described conventional technique is a toe-in setting technique which cannot be applied to a brake shoe of the type which is mixed with rigid friction particles.

DISCLOSURE OF INVENTION

An object of the present invention is to provide a brake apparatus for a cycle which is designed so that a toe-in angle of a brake shoe can be set with ease and with high accuracy when the apparatus is assembled.

The present invention is a brake apparatus for a cycle in which a support member (1) for a brake shoe (6) is operated to approach a wheel rim (4), thereby pressing the brake shoe (6) against the wheel rim (4), the brake apparatus comprising:

a clamping mechanism (5 or 15) for connecting the brake shoe (6) to the support member (1) by clamping in such a manner that an angle at which the brake shoe (6) is attached to the support member (1) is changeable; and a toe-in setting member (6c, 8 or 17) for setting a toe-in angle (A) of the brake shoe (6), the toe-in setting member (6c, 8 or 17) being subjected to positional control by a clamping operation of the clamping mechanism (5 or 15) so as to create a set state of the brake shoe (6) in which the brake shoe (6) contacts the wheel rim (4) with the toe-in angle (A).

The toe-in setting member (6c, 8 or 17) is preferably a member (6c) which is plastically deformed by clamping force of the clamping mechanism (5 or 15).

Further, the toe-in setting member (6c, 8 or 17) is preferably a member (17) which is elastically maintained in a projecting posture, and which is withdrawn by clamping force of the clamping mechanism (5 or 15).

Further, the toe-in setting member (6c or 17) may be arranged such that it is retained in a retaining hole (16) which is provided in the support member (1) in such a manner that the toe-in setting member (17) can project from and withdraw into the retaining hole (16), and that the toe-in setting member (17) is maintained in a projecting posture by an elastic member (18) which is disposed in the retaining hole (16).

Method of Assembling Brake Apparatus for Cycle According to the Present Invention The brake apparatus for a cycle according to the present invention is assembled as follows:

When the toe-in setting member is deformed, a difference is produced between the angle at which the brake shoe is attached to the support member before the deformation and the angle at which the brake shoe is attached to the support member after the deformation. The amount of deformation of the toe-in setting member has previously been set so that the difference in angle will become a predetermined toe-in angle.

First, the brake shoe is attached to the support member by adjusting the setting angle so that the friction surface of the brake shoe and the friction surface of the wheel rim contact each other over the entire surface. Thereafter, the clamping mechanism is operated to effect clamping. Consequently, the brake shoe comes in contact with the wheel rim with a predetermined toe-in angle.

If a member which is elastically maintained in a projecting posture is employed as a toe-in setting member, even if the clamping mechanism is untightened to cancel the clamping after the brake shoe has been secured to the support member, the toe-in setting member can assume a projecting posture again. In other words, even after the brake shoe has been secured to the support member by clamping, the toe-in angle can be reset by canceling the clamping.

Effects of the Invention

The effects of the present invention are as follows: In the brake apparatus of the present invention, a toe-in angle is set on the basis of a posture in which the friction surface of the brake shoe is pressed against the friction surface of the wheel rim. In other words, a toe-in angle is set by using the surface of the wheel rim as a reference. Accordingly, the brake shoe contacts the wheel rim with a toe-in angle while accurately maintaining the set posture. Therefore, it has become possible to apply the brakes effectively while preventing the occurrence of vibration and noise.

Moreover, the toe-in setting member in the present invention is deformed by clamping force of the clamping mechanism, and it can also be provided on a member or portion other than the friction surface of the brake shoe. Accordingly, it is possible to set a toe-in angle with high accuracy and operate the brake effectively not only when a material which is not mixed with rigid friction particles is used as a brake shoe material, but also when a brake shoe material which is mixed with rigid friction particles is used.

Further, in a case where a member which is elastically maintained in a projecting posture is employed as a toe-in setting member, even when the brake shoe is worn as it is used, the toe-in angle can be reset, conveniently.

BEST MODE FOR CARRYING OUT THE INVENTION

First Embodiment

Figure 1:
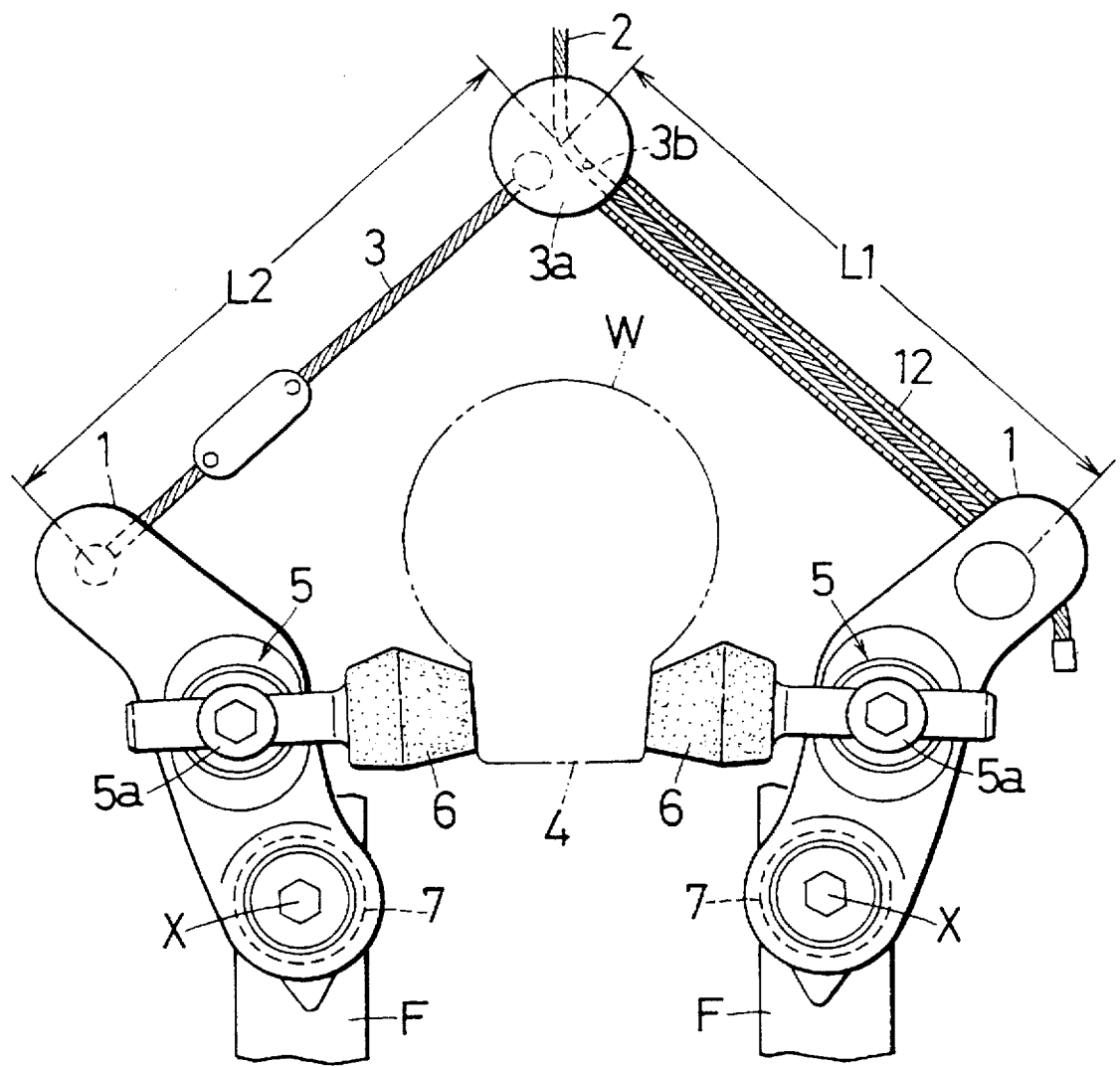
FIG. 1 is a front view of a cantilever caliper brake apparatus for a cycle according to a first embodiment.
Figure 2:
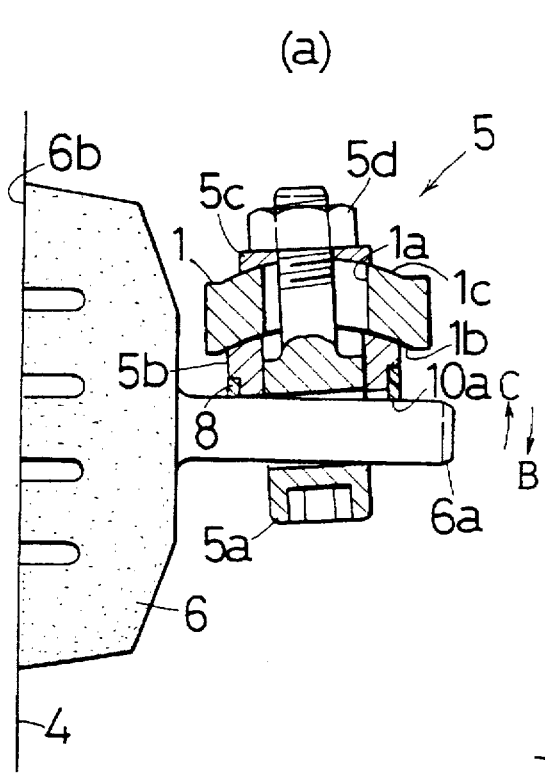
FIGS. 2(a) and 2(b) are sectional views showing the way in which a brake shoe part of the cantilever caliper brake apparatus shown in FIG. 1 is attached.
Figure 2:
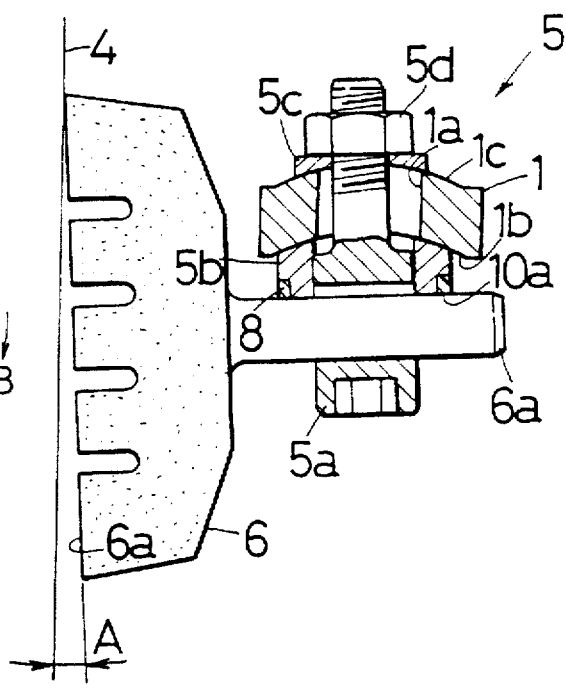
Figure 3:
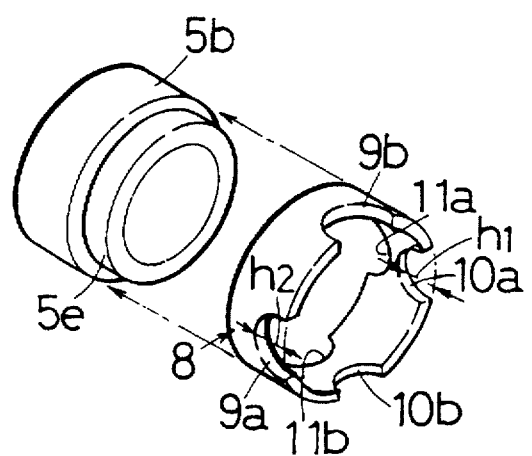
FIG. 3 is an oblique projection view showing a toe-in setting ring in the first embodiment.

FIG. 1 is a front view of a cantilever caliper brake apparatus according to a first embodiment; FIGS. 2(a) and 2(b) are sectional views showing the way in which a brake shoe of the cantilever caliper brake apparatus shown in FIG. 1 is attached; and FIG. 3 is an oblique projection view showing a toe-in setting ring. As shown in FIG. 1, a pair of brake arms 1 are attached at one end thereof to a pair of cycle body frames F which are disposed at the left and right sides, respectively, of a wheel W in such a manner that each brake arm 1 is pivotable about a pivot point X.

Since the brake arms 1 can pivot relative to the cycle body frames F about the respective pivot points X, each brake arm 1 constitutes a kind of lever mechanism. The other end of one brake arm 1, which is not pivotally supported, is connected to an end portion of a brake wire 2. The other end of the other brake arm 1 is connected to one end of a wire 3 which comprises a wire and a connecting member.

The other end of the wire 3 is connected to a coupling member 3a. The coupling member 3a has a sliding surface 3b formed therein. The brake wire 2 slides on the sliding surface 3b. Thus, although the coupling member 3a and the brake wire 2 are not connected to each other, since the brake wire 2 slides on the sliding surface 3b of the coupling member 3a, when the brake wire 2 is pulled, the wire 3 is pulled through the coupling member 3a. Consequently, pulling the brake wire 2 causes the other ends of the brake arms 1 to be simultaneously pivoted, thereby driving the brake arms 1. Thus, a cantilever caliper brake apparatus for a cycle which is activated by an operation of pulling and releasing the brake wire 2 is constructed.

By pulling the brake wire 2, both the left and right brake arms 1 are pivoted upwardly (as viewed in FIG. 1), thereby bringing the other ends of the brake arms 1 closer to the rim 4 of the wheel W. In response to this operation, brake shoes 6, which are attached to the respective intermediate portions of the brake arms 1 by respective clamping mechanism 5 are pressed against friction surfaces on both sides of the wheel rim 4, thereby applying friction for braking, and thus effecting a braking action.

When the brake wire 2 is released, both the brake arms 1 are pivoted downwardly (as viewed in FIG. 1) about the respective pivot points X by the biasing action of return springs 7 which are provided at the respective proximal end portions of the brake arms 1. The pivoting motion of the brake arms 1 causes the left and right brake shoes 6 to separate from the side surfaces of the wheel rim 4, thus canceling the braking operation.

It should be noted that a tubular member 12 which is shown in FIG. 1 is used to slidably receive the brake wire 2. When the brake is operated, the pulling action of the brake wire 2 causes one end of the tubular member 12 to abut on one brake arm 1 and also causes the other end of the tubular member 12 to abut on the coupling member 3a, thereby effecting a supporting action so that the distance L1 between the brake arm 1 and the coupling member 3a becomes a set length, and also maintaining the distance.

The brake wire 2 slidably passes through the coupling member 3a. However, when a braking operation is carried out, the distance L1 between one brake arm 1 and the coupling member 3a and the distance L2 between the other brake arm 1 and the coupling member 3a become equal to each other by the above-described supporting and distance maintaining action of the tubular member 12. Thus, both the left and right brake shoes 6 can simultaneously press against the wheel rim 4 with equal pressures to effect braking action.

The above-described clamping mechanism 5 for attaching each brake shoe 6 to the associated brake arm 1 is shown in FIGS. 2(a) and 2(b). The brake arm 1 is provided with a screw inserting bore 1a. The shank of a mounting screw 5a is inserted into the screw inserting bore 1a.

The brake shoe 6 is provided with an integrally molded mounting shaft portion 6a for securing the brake shoe 6. The mounting shaft portion 6a is inserted into a brake shoe mounting bore which is provided in the head of the mounting screw 5a. A first washer 5b is disposed between the brake arm 1 and the mounting shaft portion 6a, and the first washer 5b is fitted on the shank of the mounting screw 5a.

As shown in FIG. 3, the outer diameter of one end of the first washer 5b is made smaller than that of the other end of the first washer 5b to form a mounting portion 5e. A toe-in setting ring 8 which is formed of a resin material in an annular configuration is fitted and secured to the mounting portion 5e. A second washer 5c is placed on a spherical upper surface of the brake arm 1. The mounting shaft portion 6a, the first washer 5b, the brake arm 1 and the second washer 5c are simultaneously clamped and thus secured by a nut 5d of the mounting screw 5a.

If the brake shoe 6 is attached to the brake arm 1 on the basis of a mounting procedure as shown in FIG. 2(a), the apparatus is assembled in a state where the whole surface of the brake shoe 6 is brought into contact with the wheel rim 4 by the action of the toe-in setting ring 8. The toe-in angle A is set on the basis of the following principle. That is, as shown in FIG. 3, one end surface of the toe-in setting ring 8 is formed with two first cut portions 9a and 9b, and two second cut portions 10a and 10b.

The relationship between the depth $h_2$ of the groove of the first cut portion 9a and the depth $h_1$ of the groove of the second cut portion 10a is given by $h_1 < h_2$. The first cut portion 9b and the second cut portion 10b also have a similar relationship to each other. When the mounting shaft portion 6a of the brake shoe 6 is inserted into the head of the mounting screw 5a, the toe-in setting ring 8 is rotated relative to the first washer 5b to effect adjusting so that the mounting shaft portion 6a is supported by either the first cut portion 9a or 9b and either the second cut portion 10a or 10b which aligns with the selected first cut portion 9a or 9b in a straight line (diametrical direction).

The toe-in setting ring 8 is made of a resin material, and has cut portions 11a and 11b which are respectively formed in the other end surfaces of the second cut portions 10a and 10b so that the toe-in setting ring 8 is readily deformable. It is preferable to vary the toe-in angle A so that a braking action can take place in an optimal way according to the surface condition of the wheel rim 4, particularly the surface roughness thereof. The surface condition is determined, for example, by the kind of grinding stone used to grind the friction surface of the wheel rim 4, and the kind of plating employed.

To increase the toe-in angle A, the depth $h_1$ of the second cut portions 10a and 10b is reduced; to reduce the toe-in angle A, the depth $h_1$ is increased.

Assembling Jig 20

Figure 5:
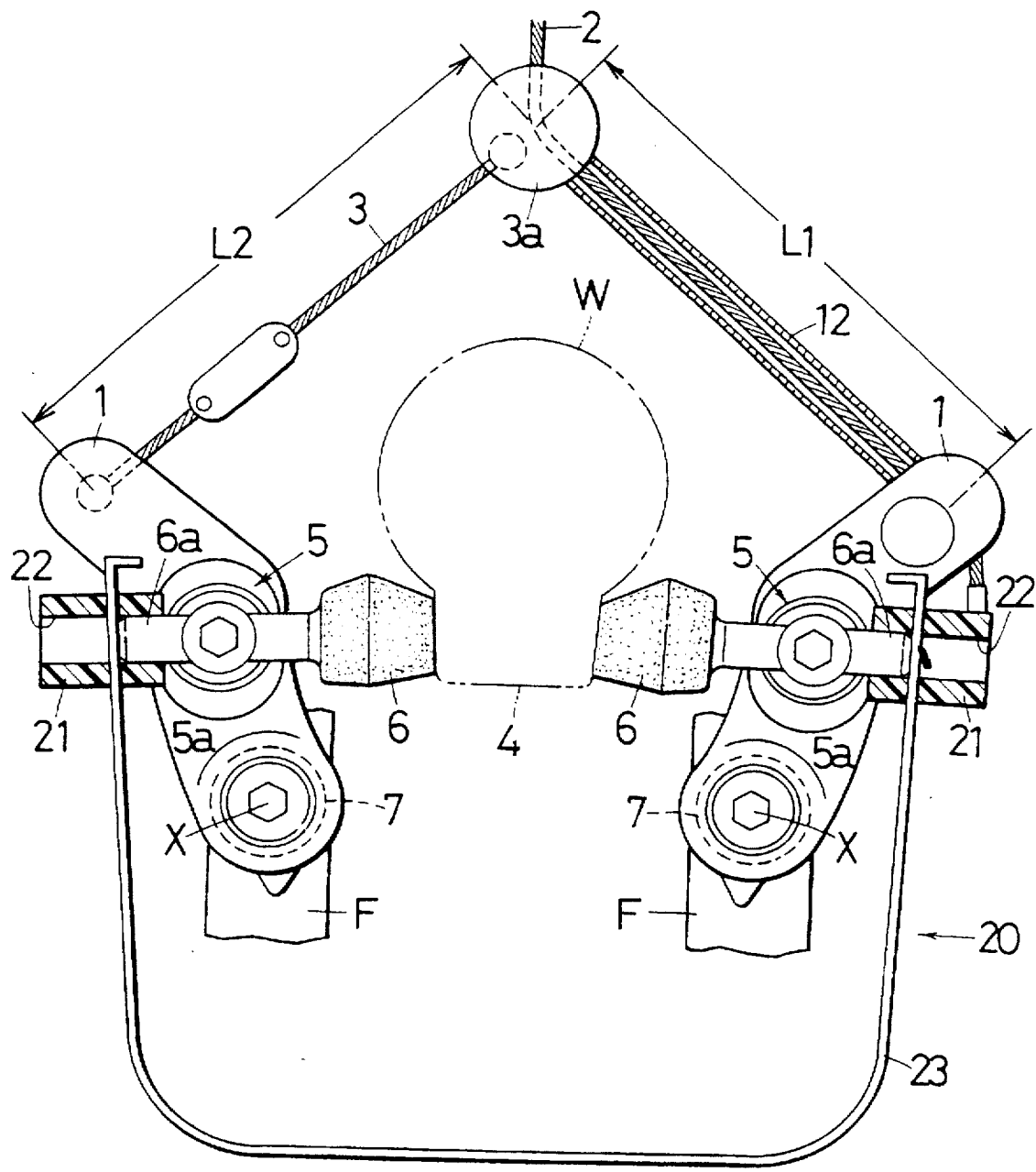
FIG. 5 shows the way in which an assembling jig is used.

FIG. 5 shows a jig for assembling the cantilever caliper brake apparatus. The assembling jig 20 is a jig for pressing the brake shoes 6 against the wheel rim 4. Cylindrical members 21, which are made of a synthetic resin material, each have a through-bore 22 formed therein. The through-bore 22 is used to receive the mounting shaft portion 6a of the brake shoe 6. Each cylindrical member 21 is pierced with one end of a steel wire 23 in the diametrical direction of the cylindrical member 21.

The steel wire 23 biases the cylindrical members 21 toward each other. Therefore, when the through-bores 22 of the cylindrical members 21 are fitted with the respective mounting shaft portions 6a of the brake shoes 6, the friction surfaces of the brake shoes 6 are brought into contact with the friction surfaces of the wheel rim 4. Next, a method of adjusting the toe-in angle A will be explained.

Method of Adjusting Toe-in Angle A

A method of adjusting the toe-in angle A of the cantilever caliper brake apparatus according to the first embodiment will be explained below. First, each member is assembled in a state such as that shown in FIG. 1. The brake arms 1 are set in an optimal angle position by adjusting the return springs 7. Clamping force that is given by the nut 5d and the mounting screw 5a is set in such a degree that the first washer 5b presses against both the brake arm 1 and the mounting shaft portion 6a with relatively weak force. That is, the degree of clamping force of the nut 5d is such that the brake shoe 6 can be pivotally adjusted with respect to the brake arm 1 in the direction of the arrow B or C shown in FIG. 2(a).

Since the washer retaining surface 1b of the brake arm 1 that acts on the first washer 5b and the washer retaining surface 1c of the brake arm 1 that acts on the second washer 5c are curved surfaces, the above-described pivotal adjustment enables the mounting screw 5a to pivot relative to the brake arm 1 in the lateral direction of the cycle body, thus making it possible to change the angle at which the brake shoe 6 is attached to the brake arm 1. Then, as shown in FIG. 2(a), the angle at which the brake shoe 6 is attached to the brake arm 1 is adjusted so that the friction surface 6b of the brake shoe 6 contacts the friction surface of the wheel rim 4 over the entire length of the friction surface 6b in the direction of movement of the wheel rim 4. It should be noted that the above adjustment can be readily made by using the above-described assembling jig 20.

Upon completion of the setting angle adjustment, the nut 5d is rotated to tighten, thereby bringing the clamping mechanism 5 into a brake shoe setting state as shown in FIG. 2(b). In this state, the mounting screw 5a causes the mounting shaft portion 6a to strongly press against the first washer 5b and also causes the first washer 5b to strongly press against the washer retaining surface 1b of the brake arm 1, thereby securing the brake shoe 6 to the brake arm 1 so that the brake shoe 6 will not be displaced even when contact reaction from the wheel rim 4 acts thereon.

At this time, clamping force that is given by the mounting screw 5a and the nut 5d acts as pressing force on the inside of the second cut portion 10a or 10b of the toe-in setting ring 8 through the mounting shaft portion 6a. Thus, the toe-in setting ring 8 is retained by the end surface of the mounting portion 5e of the first washer 5b. The toe-in setting ring 8 is made of a resin material and formed with cut portions 11a and 11b so as to be readily deformable. Accordingly, the second cut portion 10a or 10b of the toe-in setting ring 8 that faces the distal end of the mounting shaft portion 6a is plastically deformed from a state before the brake shoe 6 is clamped as shown in FIG. 2(a) into a state that is established when the brake shoe 6 is clamped, thus causing the posture to change. It should be noted that the toe-in setting ring 8 cannot be restored once it has been plastically deformed.

As a result of the plastic deformation, the toe-in setting ring 8 allows the brake shoe 6 to be attached to the brake arm 1 as shown in FIG. 2(b). That is, the brake shoe 6 is attached to the brake arm 1 in a state where it contacts the wheel rim 4 with the toe-in angle A which is determined by the deformation of the toe-in setting ring 8.

It should be noted that the second cut portions 10a and 10b of the toe-in setting ring 8 may be formed with the same depth. In this case, as the brake shoe 6 is secured by clamping with the clamping mechanism 5, the toe-in setting ring 8 is plastically deformed at either the second cut portion 10a or 10b, which becomes incapable of being reused. In such a case, when the brake shoe 6 is to be resecured, the second cut portion 10b or 10a which remains undeformed after the brake shoe has first been secured can be used to reset the toe-in angle A.

In other words, these toe-in angle setting rings 8 are advantageous in that they can be reused to set a toe-in angle A. Further, the above-described toe-in setting ring 8 may be formed by using a material of excellent elastic resilience (not shown) so that, when the clamping of the brake shoe 6 to the brake arm 1 by the clamping mechanism 5 is canceled, the toe-in setting ring 8 is elastically restored to the brake shoe setting state shown in FIG. 2(a) from the brake shoe setting state shown in FIG. 2(b).

In this case, when the brake shoe 6 is to be resecured to the brake arm 1 after the securing of the brake shoe 6 to the brake arm 1 has been canceled, the toe-in setting ring 8 can be reused to set a toe-in angle A.

Figure 4:
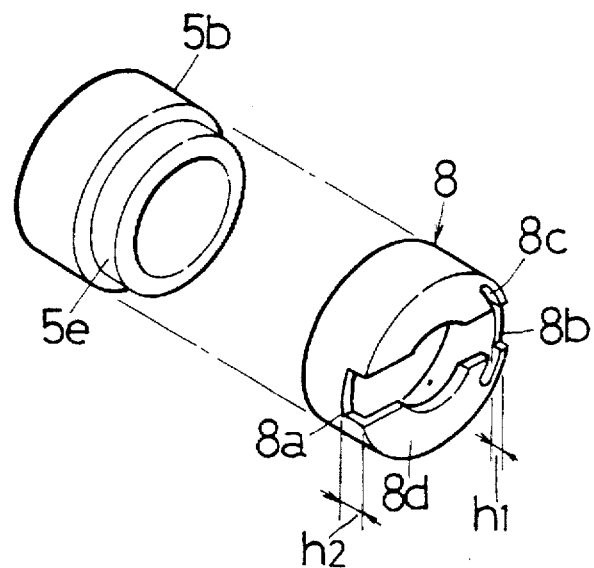
FIG. 4 is an oblique projection view showing another toe-in setting ring usable in the first embodiment.

FIG. 4 shows another example of a toe-in setting ring. The toe-in setting ring 8 in the first embodiment has the first cut portions 9a and 9b and the second cut portions 10a and 10b, which are formed to align with the first cut portions 9a and 9b, respectively, in a straight line. The first cut portion 8a shown in FIG. 4 is formed so that the groove has a depth $h_2$. The second cut portion 8b is formed so that the groove has a depth $h_1$ which is smaller than the groove depth $h_2$ of the first cut portion 8a.

Further, an end surface 8d is formed on the front side of the toe-in setting ring 8. The end surface 8d is formed with a circumferential third cut portion 8c which is a throughbore. The third cut portion 8c allows the toe-in setting ring 8 to be readily deformable when the second cut portion 8b is pressed.

Second Embodiment

Figure 6:
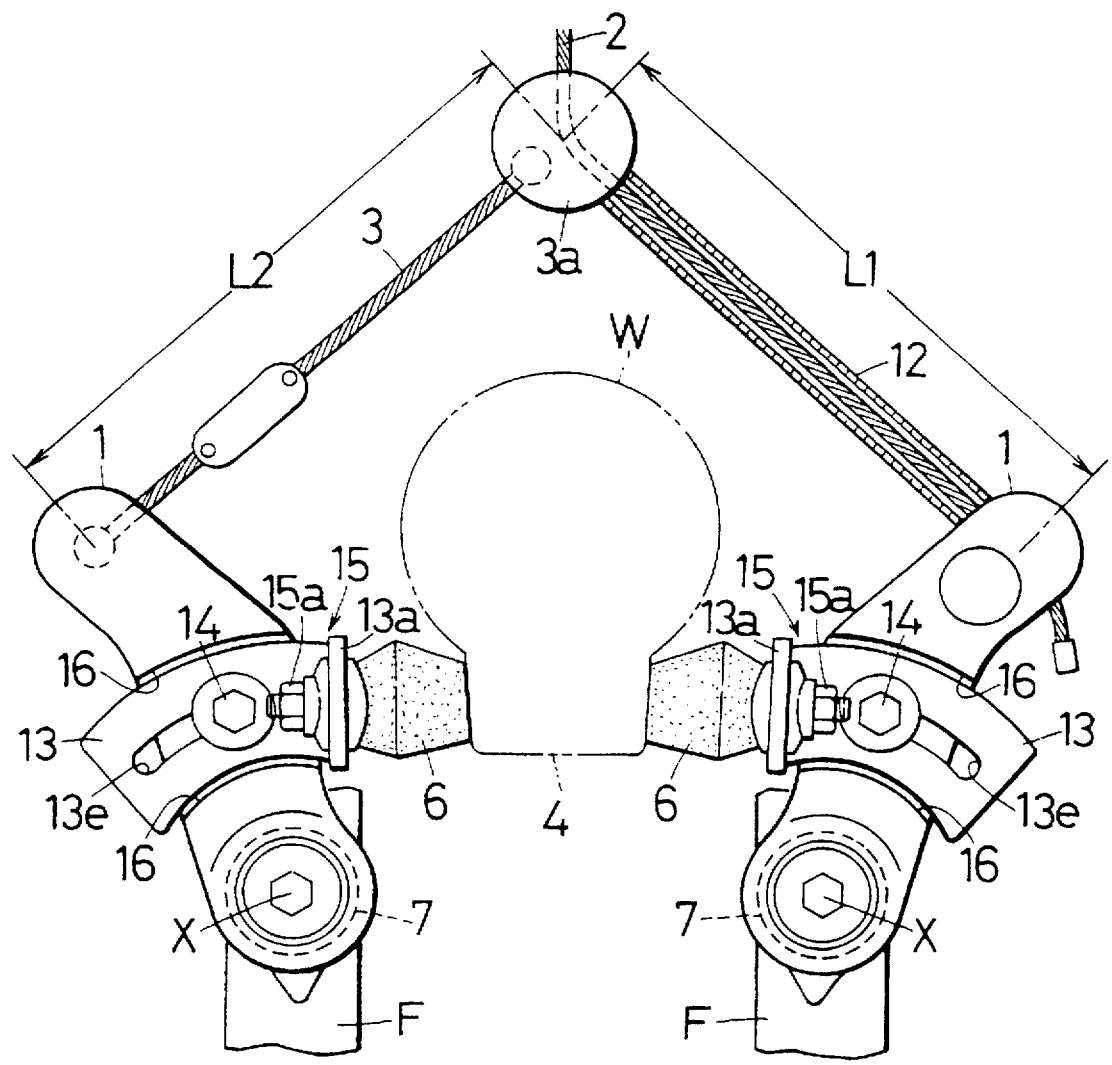
FIG. 6 is a front view of a cantilever caliper brake apparatus for a cycle according to a second embodiment.

FIG. 6 is a front view of a cantilever caliper brake apparatus for a cycle according to a second embodiment; and FIGS. 7(a) and 7(b) are sectional views showing the way in which the brake shoe part shown in FIG. 6 is attached. The brake apparatus for a cycle according to the second embodiment is operated by a brake wire 2 in the same way as in the case of the brake apparatus according to the first embodiment. One end of each brake arm 1 is provided on a cycle body frame F so as to be pivotable about a pivot point X. An L-shaped support member 13 is attached to the brake arm 1, and a clamping mechanism 15, which comprises a mounting nut 15a and other members, is secured to the support member 13. The clamping mechanism 15 secures a brake shoe 6.

By bringing each brake arm 1 closer to a wheel rim 4, the brake shoe 6 is pressed against a friction surface of the wheel rim 4 to brake a wheel W. The support member 13 is provided with a screw inserting bore 13e for a mounting nut 14 (see FIG. 6). Since the screw inserting bore 13e is formed as an elongated bore in the shape of a circular arc centered at the pivot point X of the brake arm 1, it is possible to change the angular position in which the support member 13 is secured.

The brake arm 1 is formed with a recessed inner wall surface 16 so that the support member 13 can enter the inner wall surface 16. The inner wall surface 16 is formed as a curved surface in the shape of a circular arc centered at the pivot point X. The inner wall surface 16 allows the support member 13 to slide relative to the brake arm 1 along a circular locus centered at the pivot point X. The sliding operation of the support member 13 makes it possible to adjust the angular position in which the brake shoe 6 is attached to the brake arm 1, thus making it possible to adjust the gap between the brake shoe 6 and the wheel rim 4 when the brake is not operated, that is, the shoe clearance.

The clamping mechanism 15 is adapted to secure the brake shoe 6, as shown in FIGS. 7(a) and 7(b). The support member 13 has a shoe supporting portion 13a formed in a spherical configuration. The spherical configuration is formed by securing two spherical washers 13d together as one unit by welding. The shoe supporting portion 13a is provided with a shoe mounting bore 13c. A mounting shaft portion 6a of the brake shoe 6 is inserted into the shoe mounting bore 13c. The brake shoe 6 is arranged by using a washer 15b and a mounting nut 15a, which are formed so as to fit on the mounting shaft portion 6a.

Figure 7:
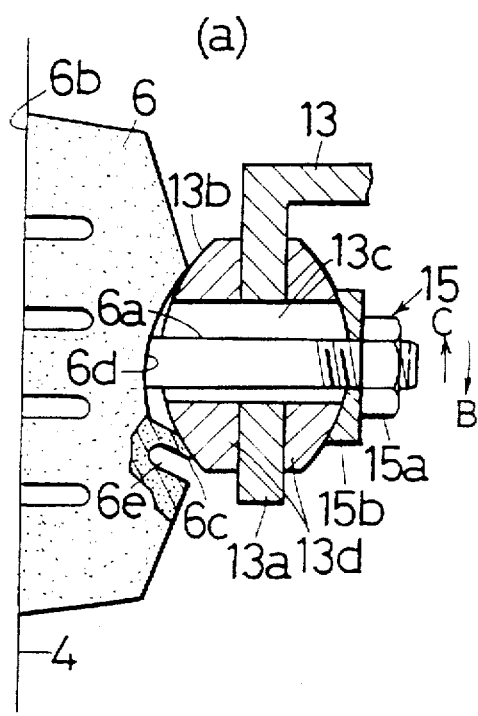
FIGS. 7(a) and 7(b) are sectional views showing the way in which a brake shoe part of the second embodiment is attached.
Figure 7:
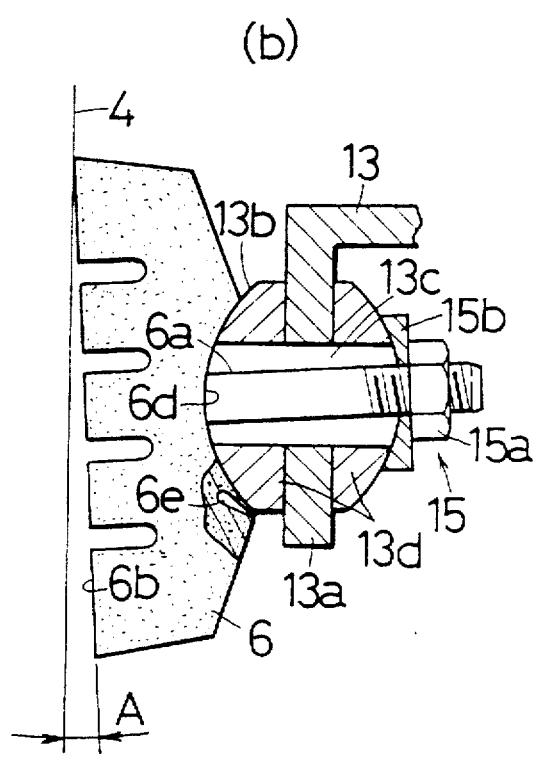

As shown in FIG. 7, a portion of the back of the brake shoe 6 which faces a shoe retaining surface 13b of the shoe supporting portion 13a is formed with a toe-in setting tongue 6c by integral molding. As shown in the sectional view of FIG. 7(b), when the brake shoe 6 is attached to the brake arm 1, the brake shoe 6 is allowed to contact the wheel rim 4 with a predetermined toe-in angle A by deformation of the toe-in setting tongue 6c. A method of attaching the brake shoe 6 to the wheel rim 4 with the toe-in angle A provided therebetween will be explained below.

First, the clamping mechanism 15 is brought into a shoe setting state as shown in FIG. 7(a) with the mounting nut 15a insufficiently tightened. In this state, the brake shoe 6 is attached to the support member 13 with such a setting angle that a gap is provided between the back 6d of the brake shoe 6 and the shoe retaining surface 13b by the erection of the toe-in setting tongue 6c. At this time, it is possible to adjust the angle at which the brake shoe 6 is attached to the support member 13.

That is, the brake shoe 6 can be pivoted relative to the support member 13 in the direction of the arrow B or C in FIG. 7(a) for adjustment partly because the brake shoe 6 is pressed against the shoe retaining surface 13b with relatively weak clamping force from the mounting nut 15a, and partly because the diameter of the shoe mounting bore 13c of the shoe supporting portion 13a is larger than the outer diameter of the mounting shaft portion 6a.

The pivotal adjustment enables a change in the angle at which the brake shoe 6 is attached to the support member 13. Thus, the angle at which the brake shoe 6 is attached to the support member 13 is adjusted so that the braking surface 6b of the brake shoe 6 contacts the wheel rim 4 over the entire length thereof in the direction of movement of the wheel rim 4, as shown in FIG. 7(a).

Upon completion of the setting angle adjustment, the mounting nut 15a is rotated to tighten, thereby bringing the clamping mechanism 15 into a shoe setting state as shown in FIG. 7(b). In this state, clamping force from the mounting nut 15a causes the back 6d of the brake shoe 6 to press strongly against the shoe retaining surface 13b. Thus, the shoe retaining surface 13b of the spherical washer 13d and the back 6d of the brake shoe 6 stick fast to each other so that they will not move relative to each other.

Accordingly, the brake shoe 6 is secured to the support member 13 so that the brake shoe 6 will not be displaced even when frictional reaction from the wheel rim 4 acts thereon. At this time, clamping force from the mounting nut 15a causes the toe-in setting tongue 6c to be pressed against the shoe retaining surface 13b. As a result, the toe-in setting tongue 6c is elastically deformed in a flattened posture (collapsed state) and enters an accommodating recess 6e as a space defined in the brake shoe 6.

Consequently, the gap between the back 6d of the brake shoe 6 and the shoe retaining surface 13b of the support member 13 disappears, and the posture in which the brake shoe 6 is attached to the support member 13 changes from that shown in FIG. 7(a) to that shown in FIG. 7(b). Thus, the toe-in setting tongue 6c allows the brake shoe 6 to be attached to the support member 13 in a state such as that shown in FIG. 7(b).

That is, the brake shoe 6 is attached to the support member 13 in such a manner that the brake shoe 6 contacts the wheel rim 4 with a toe-in angle A which is determined by the elastic deformation of the toe-in setting tongue 6c. The brake shoe 6 can start a braking operation in the state where it has the toe-in angle A.

In the case of the above-described toe-in setting structure, when the clamping of the brake shoe 6 to the support member 13 by the clamping mechanism 15 is canceled, the toe-in setting tongue 6c is elastically restored to the erect posture shown in FIG. 7(a) from the flattened posture shown in FIG. 7(b). In other words, when the brake shoe 6 is to be resecured to the support member 13 by clamping, the toe-in angle A can be advantageously reset by using the toe-in setting tongue 6c.

Third Embodiment

Figure 8:
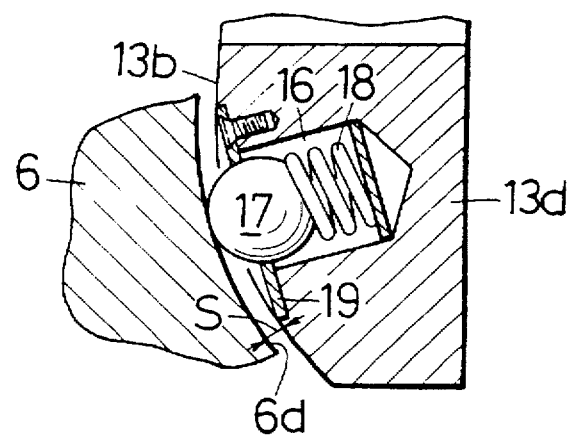
FIG. 8 is a sectional view of a toe-in setting mechanism in a third embodiment.

FIG. 8 shows a structure for setting a toe-in angle according to a third embodiment, which may be applied to the brake apparatus for a cycle shown in FIGS. 6 and 7. That is, the support portion 13d of the shoe retaining surface 13b of the shoe supporting portion 13a is provided with a retaining hole 16 as a blind hole. A toe-in setting ball 17 and a coil spring 18 are inserted into and thus installed in the retaining hole 16. The toe-in setting ball 17 and the coil spring 18 are retained so as not to fall from the retaining hole 16 by a stopper 19 which is attached to the support portion 13b.

The toe-in setting ball 17 is biased by the coil spring 18 so as to assume a posture in which a part of the toe-in setting ball 17 always projects outside the retaining hole 16 from a through-hole provided in the stopper 19. The toe-in setting ball 17 presses against the back 6d of the brake shoe 6 to form a gap S. After all, the toe-in setting ball 17 carries out the same function as that of the toe-in setting tongue 6c in the second embodiment, and it is used to set the above-described toe-in angle A.

The toe-in setting member in the third embodiment supports the support member 13 at one end of the back 6d of the brake shoe 6 in the same way as in the case of the toe-in setting tongue 6c shown in FIG. 7(a). Accordingly, when the angle at which the brake shoe 6 is attached to the support member 13 is adjusted so that the braking friction surface 6b of the brake shoe 6 contacts the wheel rim 4 over the entire surface thereof, a gap S which is similar to that in FIG. 7(a) is produced between the back 6d of the brake shoe 6 and the shoe retaining surface 13b of the supporting portion 13a.

When the clamping mechanism 15 is tightened to secure the brake shoe 6 to the support member 13, clamping force from the clamping mechanism 15 causes the toe-in setting ball 17 to withdraw into the retaining hole 16 while elastically deforming the coil spring 18. Consequently, the gap S between the back 6d of the brake shoe 6 and the shoe retaining surface 13b of the supporting portion 13a disappears in the same way as in FIG. 7(b). Thus, the brake shoe 6 is attached to the support member 13 in such a state that, when the brake is operated, the brake shoe 6 contacts the wheel rim 4 with the toe-in angle A.

Although in the third embodiment, the toe-in setting member is the ball 17, it should be noted that the toe-in setting member is not necessarily limited to the ball, and that it may be changed to a member having a different specific configuration, e.g. a pin or a roller. It is also possible to replace the coil spring 18 by a leaf spring or a spring member made of a rubber or plastic material. Accordingly, the coil spring 18 and alternative spring members may be generally called "elastic member 18".

In the case of the toe-in setting structure in the third embodiment, when the clamping of the brake shoe 6 to the support member 13 by the clamping mechanism 15 is canceled, the toe-in setting ball 17 is elastically restored to the posture in which it projects from the retaining hole 16 from the posture in which the toe-in setting ball 17 is withdrawn into the retaining hole 16. That is, when the brake shoe 6 is to be resecured to the support member 13 by clamping, the toe-in angle A can be advantageously reset by using the toe-in setting ball 17.

Further, since the toe-in setting ball 17 is provided on the brake arm (1) side, it can be used to set the toe-in angle A when the brake shoe 6 is replaced by a new brake shoe because it has become worn, for example. That is, the brake shoe 6, which is an expendable member, can be attached to the brake arm with a toe-in angle A despite its inexpensive structure having no toe-in setting arrangement.

When constructing the brake apparatus and the toe-in setting structure which are shown in FIGS. 7 or 8, the toe-in setting tongue 6c or the toe-in setting ball 17 may be provided at each of two positions which are forward and rearward of the mounting shaft portion 6a of the brake shoe 6 as viewed in the direction of movement of the wheel rim 4.

In this case, the pair of tongues 6c or balls 17 may be arranged such that the tongue 6c or ball 17 which lies rearward as viewed in the direction of movement of the wheel rim 4 is more deformed by the clamping operation of the clamping mechanism 15 than the tongue 6c or ball 17 which lies forward as viewed in the direction of movement of the wheel rim 4, whereby a toe-in angle A is set by the difference in deformation between the pair of tongues or balls, and a shoe clearance is set by deformation of both the tongues or balls. With this arrangement, both a toe-in angle and a shoe clearance can be simultaneously set advantageously simply by securing the brake shoe to the brake arm by clamping.

The present invention may also be applied to a side pull caliper brake and a center pull caliper brake in addition to cantilever caliper brakes for a cycle such as those in the above-described embodiments. The present invention may also be applied to a brake arranged such that a brake shoe is pressed against a wheel rim by sliding a brake shoe supporting member in the lateral direction of the cycle body, that is, in a direction perpendicular to the friction surface. Therefore, the above-described brake arm 1 is called simply "support member 1".

Although reference symbols are put in the claims to facilitate the reference to the accompanying drawings, it should be noted that the present invention is not limited to the arrangements shown in the accompanying drawings by the entry of reference symbols.

INDUSTRIAL APPLICABILITY

The present invention is applicable to a brake apparatus for a cycle, particularly a mountain bike. However, the present invention is not limited thereto but may also be applied to other brake apparatuses such as a disk brake apparatus for a motorbike.

What is claimed is:

1. A brake apparatus for a cycle in which a support member (1) for a brake shoe (6) is operated to approach a wheel rim (4), thereby pressing said brake shoe (6) against said wheel rim (4), said brake apparatus comprising:

a clamping mechanism (5 or 15) for connecting said brake shoe (6) to said support member (1) by clamping in such a manner that an angle at which said brake shoe (6) is attached to said support member (1) is changeable; and a toe-in setting member (8 or 6c) which is more readily deformable than other parts in said clamping mechanism (5 or 15) for setting a toe-in angle (A) of said brake shoe (6), said toe-in setting member (8 or 6c) being deformed by clamping force of said clamping mechanism 5 or 15), thereby creating a set state of said brake shoe (6) in which said brake shoe (6) contacts said wheel rim (4) with said toe-in angle (A).

2. A brake apparatus for a cycle according to claim 1, wherein said toe-in setting member (8 or 6c) is as plastically deformable member (8) which is provided on said clamping mechanism (5 or 15).

3. A brake apparatus for a cycle according to claim 1, wherein said toe-in setting member (8 or 6c) is an elastically deformable member (6c) which is provided on said brake shoe (6).

4. A brake apparatus for a cycle in which a support member (1) for a brake shoe (6) is operated to approach a wheel rim (4), thereby pressing said brake shoe (6) against said wheel rim (4), said brake apparatus comprising:

a clamping mechanism (5 or 15) for connecting said brake shoe (6) to said support member (1) by clamping in such a manner that an angle at which said brake shoe (6) is attached to said support member (1) is changeable; and a member (17) which is supported by an elastic member (18) so as to be capable of projecting and withdrawing to set a toe-in angle (A) of said brake shoe (6) in such a manner that, when said elastic member (18) is elastically deformed by clamping force of said clamping mechanism (5 or 15), said member (17) creates a set state of said brake shoe (6) in which said brake shoe (6) contacts said wheel rim (4) with said toe-in angle (A).

5. A brake apparatus for a cycle according to claim 4, wherein said member (17) is a spherical member (17) which is retained in a retaining hole (16) which is provided in said support member (1) in such a manner that said spherical member (17) can project from and withdraw into said retaining hole (16), and said elastic member (18) is a coil spring (18) which is disposed in said retaining hole (16) to support and project said spherical member (17) from said retaining hole (16).

* * * * *